US005624220A

United States Patent [19]
Janssen et al.

[11] Patent Number: 5,624,220
[45] Date of Patent: Apr. 29, 1997

[54] ATTACHMENT MEMBER INCLUDING A NAIL AND A PRESTRESSING ELEMENT

[75] Inventors: Rupert Janssen, Meiningen; Markus Fröwis, Frastanz, both of Austria; Luc Guillon, Sax, Switzerland

[73] Assignee: Hitti Aktiengesellschaft, Schaan, Liechtenstein

[21] Appl. No.: 529,119

[22] Filed: Sep. 15, 1995

[30] Foreign Application Priority Data

Sep. 15, 1994 [DE] Germany .......................... 44 32 783.8

[51] Int. Cl.$^6$ ................. F16B 15/00; F16B 15/02; F16L 3/08
[52] U.S. Cl. ................. 411/441; 411/480; 411/544; 248/74.5
[58] Field of Search ................. 411/440, 441, 411/480, 482, 533, 544, 923; 248/74.5, 547

[56] References Cited

U.S. PATENT DOCUMENTS

| | | | |
|---|---|---|---|
| 2,961,210 | 11/1960 | Pfaff et al. | 248/74.5 |
| 3,320,845 | 5/1967 | Eschweiler | 411/441 |
| 3,491,648 | 1/1970 | Thurner . | |
| 4,903,920 | 2/1990 | Merritt | 248/74.5 |
| 4,915,561 | 4/1990 | Bohri et al. | 411/441 |
| 5,178,503 | 1/1993 | Losada | 411/441 |

FOREIGN PATENT DOCUMENTS

| | | | |
|---|---|---|---|
| 486273 | 3/1972 | Australia . | |
| 0484427 | 6/1977 | Australia | 411/441 |
| 4327436 | 12/1994 | Germany . | |
| 1146816 | 3/1969 | United Kingdom | 411/441 |

OTHER PUBLICATIONS

European Search Report, Number EP 95 810 478.8 dated Apr. 3, 1996.

Primary Examiner—Steven N. Meyers
Assistant Examiner—Robert G. Santos
Attorney, Agent, or Firm—Anderson Kill & Olick P.C.

[57] ABSTRACT

An attachment member arranged to be secured to a surface of a hard receiving material by an explosive powder charge operated setting tool is formed of a fastening element (1), such as a nail, and a prestressing element (2). The prestressing element assures a sound attachment by bridging differences in the depth to which the nail is driven. To increase its surface contacting the surface of the hard receiving material, the prestressing element is laterally enclosed at least in part by a plastics material part (3) so that the pressure of the attachment member in contact with the receiving material and the danger of tilting of the setting tool relative to the receiving material are reduced. Further, a recess (3b) is formed in the plastics material part (3) to improve guidance between the prestressing element (2) and a bolt guide (4) of the setting tool.

6 Claims, 2 Drawing Sheets

ATTACHMENT MEMBER INCLUDING A NAIL AND A PRESTRESSING ELEMENT

BACKGROUND OF THE INVENTION

The present invention is directed to an attachment member, including a fastening element, such as a nail, to be driven into hard receiving materials by an explosive powder charge operated setting tool, and a prestressing element. The nail has an axially extending shank with a tip at its leading end and with the prestressing element laterally enclosing at least the tip. The prestressing element has an axially extending sleeve portion and a flange-like contact part at the leading end of the sleeve portion.

Attachment members of the above type used with an explosive powder charge setting tool are preferably selected for mass production. Such attachment members are used to fasten parts such as cable conduits, cable clips, cable clamps, insulation panels, suspensions and the like. These parts are secured to hard receiving materials such as concrete, masonry, rock, steel and the like.

In anchoring the above mentioned fastening elements, a nail, bolt or similar member is driven into the hard receiving material by an explosive powder charge operated setting tool. The fastening element is laterally enclosed by a prestressing element which bears against the receiving material or against the part to be fastened to the receiving material. A load engagement means on the fastening element is displaced into contact with the prestressing element at the completion of the driving operation, with the load engagement means being in the form of a head, a collar, a threaded nut or the like.

The parts to be secured by the attachment member are formed mostly of plastics material for economic considerations and also in specific cases for purposes of insulation. The use of the plastics material for the parts to be attached results in certain problems when the attachment is effected by explosive powder charged operated setting tools. It must be assured that the part being attached is sufficiently held or clamped against the receiving material. This requires a definite setting depth of the fastening element so that on one hand there is no danger of insufficient clamping and on the other hand there is no danger of destruction to the parts being secured.

When explosive powder charge operated setting tools are used, it is difficult to obtain a precise setting depth of the fastening element. This occurs due to the lack of homogeneity of the receiving material and also because of the variations in the energy supplied by the propellant or explosive powder charges. If the fastening element does not penetrate sufficiently into the receiving material, the part to be attached is not effectively clamped against the receiving material. On the other hand, if the fastening element penetrates too deeply into the receiving material, there is the danger that the part being attached may be destroyed.

To avoid destruction of brittle materials, an attachment member is known from DE-PS 16 25 367 made up of a fastening element and a prestressing element. The prestressing element has a flange-like contact part at its leading end, and a sleeve part extending from it opposite to the driving direction.

In this known attachment member the leading end face of the flange-like contact part is larger than the transverse cross-sectional surface of the fastening element by only a limited amount. As a result, there is a considerable area pressure acting during the driving operation on the receiving material. Such pressure causes spalling to take place in brittle materials and such spalling has a negative effect on the quality of the attachment and also there is a poor appearance of the attachment. Moreover, there is a considerable danger that the explosive powder charge operated setting tool, may be tilted when it is placed against the receiving material, whereby the fastening element does not enter the receiving material in a perpendicular position. In addition, the bolt guidance in the explosive powder charge operated setting material requires an expensive and cumbersome construction to guarantee the guidance of the fastening element during the driving operation.

SUMMARY OF THE INVENTION

The primary object of the present invention is to provide an attachment member for avoiding spalling and tilting in the receiving material and to simplify and improve guidance in the use of the explosive powder charge operated setting tool.

In accordance with the present invention, the prestressing element the attachment member is partially laterally enclosed by a plastics material part having a leading end contact surface extending in the same plane with the leading end face surface of the flange-like contact part. In addition, the plastics material part has a recess at its trailing end extending toward the leading end and having a diameter corresponding to the maximum outside diameter of the flange-like contact part.

Accordingly, the prestressing element of the present invention affords overall a large leading end surface for the attachment member formed by the leading end face of the contact part and the leading end face surface of the plastics material part. As a result, the area of pressure acting on the receiving material is considerably reduced during the driving operation, since the area of the surfaces are added to one another. Accordingly, spalling of the receiving material is avoided.

Additionally, the danger of the tilting when the explosive powder charge operated setting tool is placed against the receiving material is considerably reduced, so that it is assured that the fastening element is driven perpendicularly into the receiving material.

The recess open at the trailing end of the plastics material part enables the insertion of the bolt guide of the explosive powder charge operated setting tool. Accordingly, the leading end of the bolt guide is guided externally affording adequate guidance between the attachment member and the bolt guide whereby further guidance in the form of additional metal washers can be eliminated. The load engagement means in the form of a head on a nail located within the bore in the bolt guide is also effective for guidance.

Surface conditions contributing to the avoidance of the spalling and tilting, preferably result if the contacting leading end face of the plastics material part corresponds to 3–8 times the leading end face of the flange-like contact part.

To assure adequate guidance of the bolt guide of the explosive powder charge operated setting tool, the recess in the trailing end of the plastics material part is preferably formed at least partially by a cylindrically shaped wall portion.

To ensure an adequate insertion of the bolt guide and avoid any possible transverse sliding movement, the axial height of the wall part corresponds expediently to 0.1 to 0.4 times the diameter of the recess.

The connection between the prestressing element and the plastics material part is achieved in a simple manner in a spraying or molding process, for instance, by adding the prestressing element, formed of a metal, into the injection mold for the plastics material part. This connection can be improved in the axial direction by a positive lock, preferably by providing the flange-like contact part with a step-like surface stepping inwardly in the driving direction, that is, toward the leading end of the part.

As mentioned above, the attachment members being discussed are used for fixing cable clamps in place. In particular, with cable clamps and similar members, for instance, clamp-like members, it is possible in a further embodiment of the invention to select an integral or single piece solution where the plastics material part is formed by the base of the cable clamp. The connection between the prestressing element and the cable clamp can also be achieved in an injection operation with the outside diameter of the flange-like contact part shaped in a step-wise manner for affording a positively locked connection. The particular advantage of such an attachment member is that it can be formed in an exceedingly simple assembly operation which is of a considerable importance in mass production operations as discussed here.

Accordingly, the recess for the guidance of the bolt guide in the explosive powder charge setting tool is formed in the base of the cable clamp. To avoid exceeding a thickness of the cable clamp base for affording material savings, all parts of the recess can be partially formed by ribs, making up a part of the base. Such ribs can be uniformly distributed around the circumference, whereby adequate guidance of the bolt guide is gained.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
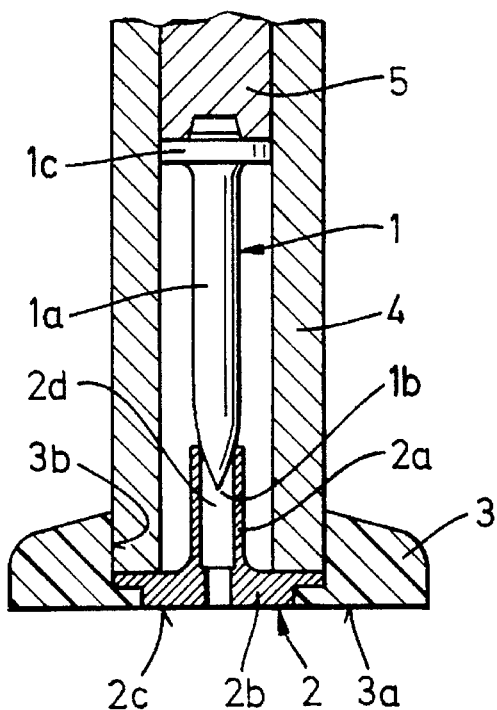
FIG. 1 is an axially extending view, partly in section, of an attachment member embodying the present invention illustrating the prestressing element and parts of an explosive powder charge operated setting tool in condition ready for driving a fastening element.
Figure 2:
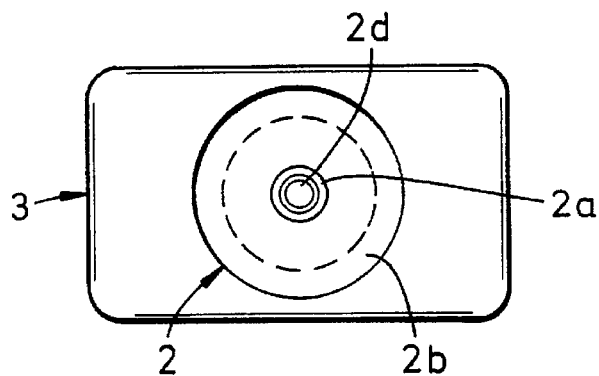
FIG. 2 is a plan view of the prestressing element and the plastics material part shown in FIG. 1.
Figure 3:
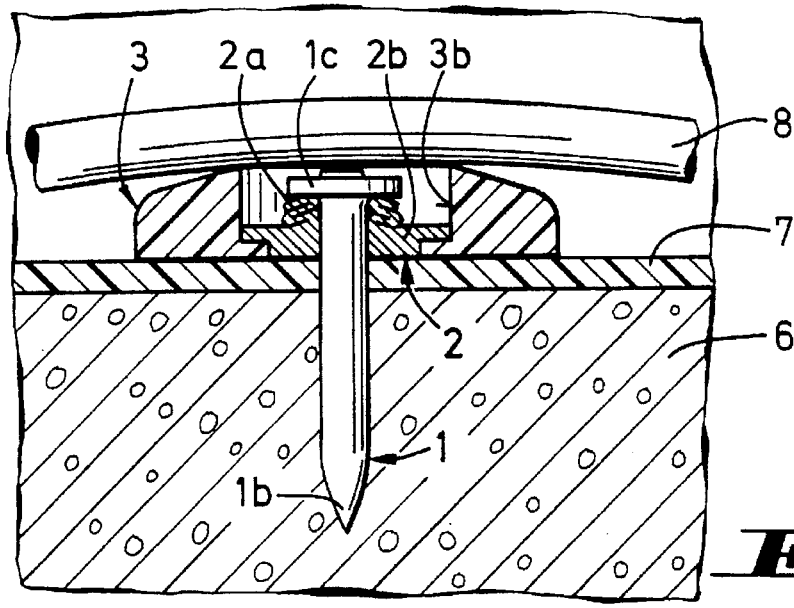
FIG. 3 is a view, partly in section, of the attachment member in FIG. 1 in connection with a cable duct with the attachment member driven into the receiving material.

In FIGS. 1–3 an attachment member is illustrated formed of a fastening element or nail 1 and a prestressing element 2. The nail 1 has an axially extending shank 1a with a tip 1b at its leading end, that is the lower end as viewed in FIG. 1, and a load engagement means in the form of a head 1c at its trailing end, that is the upper end in FIG. 1. In the following description the leading end of the various parts is the lower end as viewed in FIGS. 1 and 4 and the trailing end is the upper end.

The prestressing element has an axially extending sleeve portion 2a extending from its trailing end to a flange-like contact part 2b located at its leading end. The contact part 2b extends transversely outwardly from the leading end of the sleeve portion 2a. Further, the prestressing element 2 is partially laterally enclosed by a plastics material part 3 with the leading end face 2c of the flange-like contact part 2b and the leading end contact face 3a of the plastics material part forming a common planar end face. The axially extending outside surface of the flange-like contact part 2b is stepped for effecting a positively locked connection between the prestressing element 2 and the plastics material part 3. Note that a portion of the flange-like contact part 2b has a greater or maximum diameter than the portion extending from the leading end.

As shown in FIG. 1, the attachment member is ready for the driving operation. The tip 1b of the fastening element 1 extends into the trailing end of a receiving bore 2d of the prestressing element 2. Further, FIG. 1 shows that the plastics material part 3 has a recess 3b open at its trailing end and extending towards the leading end. The diameter of the recess 3b corresponds to the maximum outside diameter of the prestressing element 2.

Recess 3b in the plastics material part 3 serves to receive a bolt guide 4 of the explosive powder charge operated setting tool used, only the bolt guide and a piston 5 of the setting tool is shown in FIG. 1. With this arrangement an adequate guidance is provided during the driving operation with the piston 5 of the explosive powder charge operated setting tool driving the fastening element 1, note only the leading end portion of the piston is illustrated in FIG. 1 in contact with the head 1c of the fastening element 1.

While FIG. 2 is a plan view of the prestressing element 2 laterally enclosed by the plastics material part 3, FIG. 3 displays the attachment member securing a part to a receiving material 6. In this embodiment, a cable duct 7 is shown in outline attached to the receiving material 6 by the attachment member of the present invention. During the driving operation using the explosive powder charge operated setting tool, the nail or fastening element 1 is driven into the receiving material 6 and the prestressing element 2, and in particular the sleeve portion 2a is upset. Lack of homogeneity of the receiving material 6 as well as variations in the energy output of the explosive powder charge used is compensated by the upsetting action of the sleeve portion 2a. FIG. 3 shows how the head 1c of the fastening element 1 has been driven into the recess 3b to such an extent that there are no interfering projections extending axially outwardly from the plastics material part 3. This is of particular importance as shown in the illustrated embodiment, if a cable 8 contacts the trailing end surface of the attachment member. Accordingly, any danger to the cable by a protruding metal part is avoided.

Figure 4:
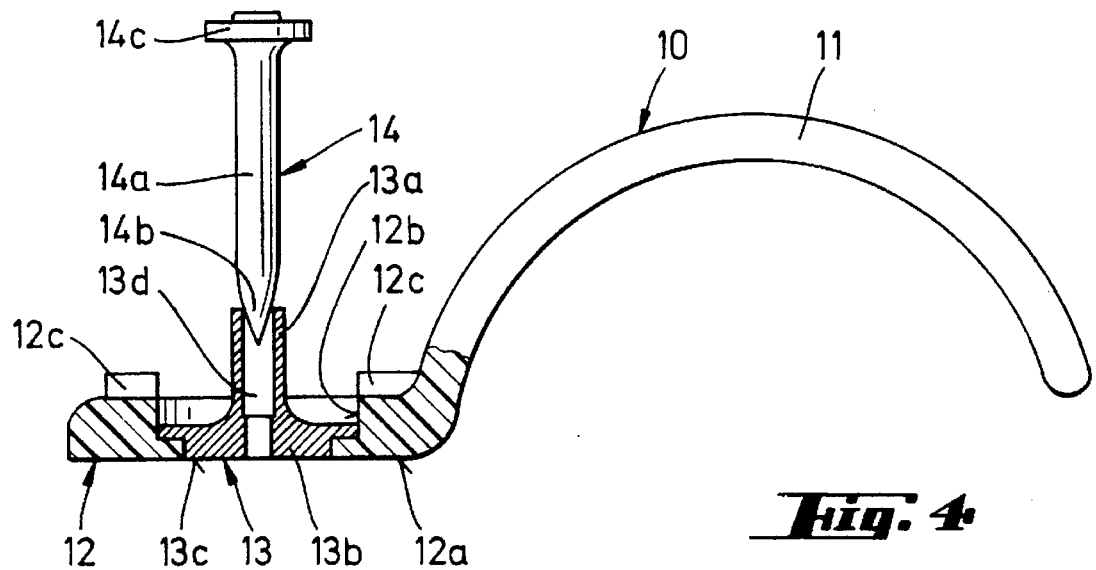
FIG. 4 is another embodiment of the attachment member incorporated in a cable clamp.
Figure 5:
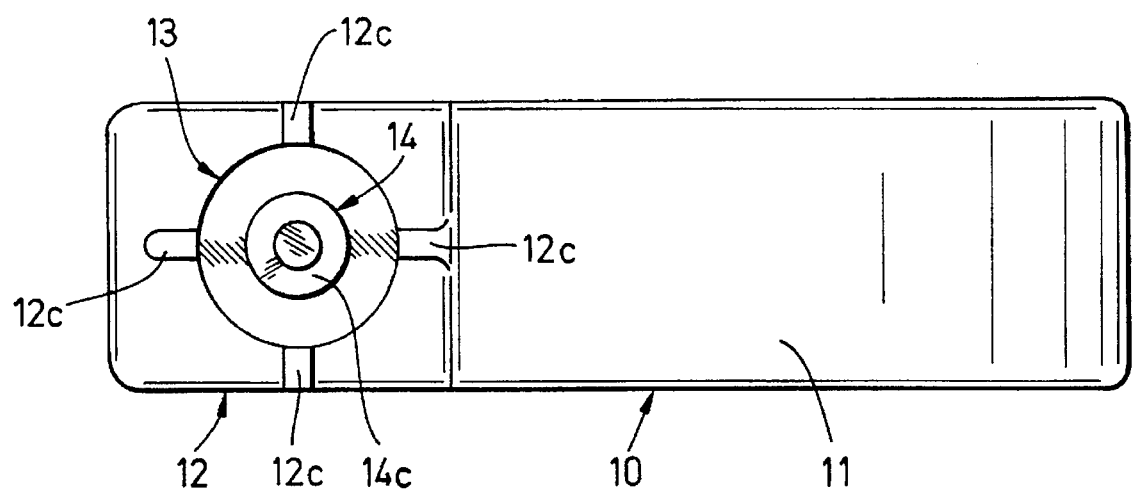
FIG. 5 is a plan view of the attachment member illustrated in FIG. 4.

In FIGS. 4 and 5 a refinement of the attachment member of the present invention is shown in the form of a cable clamp 10. The cable clamp 10 is made up of a retaining strap 11 and a base formed of a plastics material part 12. The plastics material part 12 incorporates or surrounds, as in the previous embodiment, a prestressing element 13 made up of a flange-like contact part 13b at its leading end and a sleeve portion 13a extending from the contact part to the trailing end of the prestressing element. The leading end face 13c of the flange-like contact part 13b and the leading end face surface 12a of the plastics material part 12 combine to form a planar leading end face for the attachment member.

A nail or fastening element 14 is inserted into the trailing end part of a bore 13d in the sleeve portion 13a. The fastening element has an axially extending shank 14a with a tip 14b at its leading end and a head 14c at its trailing end.

Recess 12b in the trailing end of the plastics material part 12 affords guidance for a bolt guide of the explosive powder charge operated setting tool, not shown, to be used in driving the fastening element. The recess 12b, as can be seen best in FIG. 5, is surrounded by ribs 12c projecting opposite to the driving direction and forming trailing end portions of the recess 12b thereby serving to guide the bolt guide of the explosive powder charge operated setting tool used, but not shown. The arrangement, configuration and number of such ribs 12c are shown only by way of example and can be varied as required.

To obtain a positively locked connection in the axial direction between the prestressing element 13 and the plastics material part 12 shaped as a cable clamp 10, a step-wise axially extending outside surface is provided on the flange-like contact part 13b, shown in FIG. 4. The trailing end part of the contact part 13b has the larger outside diameter.

The prestressing element 13 is formed of metal, such as steel, as shown in the embodiment of FIGS. 4 and 5 as well as in the first embodiment.

The deformability of the metal being used can be matched to the particular application, that is, attention must be paid to the type of the receiving material as well as the character of the explosive powder charges in use.

While specific embodiments of the invention have been shown and described in detail to illustrate the inventive principles, it will be understood that the invention may be embodied otherwise without departing from such principles.

We claim:

1. An attachment member arranged to be secured to a surface of a hard receiving material (6) includes a fastening element (1, 14) to be driven into the hard receiving material by an explosive powder charge operated setting tool and a prestressing element (2, 13) extending in the axial direction of said fastening element, said fastening element (1, 14) comprising an axially extending shank (1a, 14a) having a tip (1b, 14b) at a leading end thereof arranged to be driven first into the receiving material and a head (1c, 14c) at a trailing end thereof, said prestressing element laterally enclosing at least said tip (1b, 14b), said prestressing element comprising an axially extending sleeve portion (2a, 13a) with a flange-like contact part (2b, 13b) having a leading end planar face surface (2c, 13c) at a leading end thereof and said contact part having a maximum outside diameter, wherein the improvement comprising that said prestressing element (2, 13) is partially laterally enclosed by a plastics material part (3, 12) extending in the axial direction of said fastening element and having a leading end planar contact surface (3a, 12a) forming a common continuous contact surface with the leading end face surface (2c, 12c) of said flange-like contact part and a trailing end recess (3b, 12b) open at the trailing end thereof and extending toward the leading end thereof and said recess having a diameter corresponding substantially to said maximum outside diameter of said contact part (2b, 13b), and said recess (3b, 12b) being stepped inwardly towards said leading end planar contact surface.

2. Attachment member, as set forth in claim 1, wherein said contact face (3a, 12a) of said plastics material part (3, 12) has an area corresponding to 3–8 times the area of the leading end face surface of said flange-like contact part (2b, 3b).

3. Attachment member, as set forth in claim 1 or 2, wherein said recess (3b, 12b) is formed at least partially by a cylindrically shaped wall portion.

4. Attachment member, as set forth in claim 3, wherein the cylindrical shaped wall portion has an axial dimension corresponding to 0.2 to 0.4 times the diameter of said recess (3b, 12b).

5. Attachment member, as set forth in claim 1 or 2, wherein said plastics material part (12) is formed by a base of a cable clamp (10).

6. Attachment member, as set forth in claim 5, wherein said recess (12b) has axially extending wall portions formed at least in part by axially extending ribs (12c).

* * * * *